(12) United States Patent
Mathe

(10) Patent No.: US 9,882,479 B2
(45) Date of Patent: Jan. 30, 2018

(54) SWITCHING REGULATOR CIRCUITS AND METHODS

(71) Applicant: QUALCOMM Incorporated, San Diego, CA (US)

(72) Inventor: Lennart Karl-Axel Mathe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/857,080

(22) Filed: Sep. 17, 2015

(65) Prior Publication Data

US 2017/0085176 A1  Mar. 23, 2017

(51) Int. Cl.
H02M 3/158 (2006.01)

(52) U.S. Cl.
CPC ......... *H02M 3/158* (2013.01); *H02M 3/1584* (2013.01)

(58) Field of Classification Search
None
See application file for complete search history.

(56) References Cited

U.S. PATENT DOCUMENTS

| | | | |
|---|---|---|---|
| 6,281,662 B1 | 8/2001 | Flohr | |
| 8,564,260 B2 | 10/2013 | Carobolante et al. | |
| 8,718,188 B2 | 5/2014 | Balteanu et al. | |
| 2005/0189931 A1* | 9/2005 | Ishino | H02M 3/1584 323/282 |
| 2013/0093514 A1* | 4/2013 | Xu | H02M 3/1582 330/129 |
| 2013/0293210 A1* | 11/2013 | Smith | H02M 3/1584 323/282 |
| 2014/0266085 A1 | 9/2014 | Unno | |
| 2014/0268946 A1 | 9/2014 | Liu | |
| 2015/0042295 A1* | 2/2015 | Cowley | H02M 3/158 323/269 |
| 2015/0042298 A1 | 2/2015 | Kung et al. | |
| 2016/0072312 A1 | 3/2016 | Ichikawa et al. | |

FOREIGN PATENT DOCUMENTS

WO   2015005155 A1   1/2015

OTHER PUBLICATIONS

International Search Report—PCT/US2016/049154—ISA/EPO—dated Dec. 8, 2016.
Written Opinion—PCT/US2016/049154—ISA/EPO—dated Dec. 8, 2016.

\* cited by examiner

*Primary Examiner* — Jeffrey Y Gblende
(74) *Attorney, Agent, or Firm* — Haynes and Boone, LLP

(57) ABSTRACT

In one embodiment, a switching regulator includes a first switching regulator stage configured between an input voltage and a first reference voltage and a second switching regulator stage configured between the first reference voltage and a second reference voltage. A first terminal of an inductor is coupled to an output of the first switching regulator stage and an output of the second switching regulator stage. The first switching regulator stage operates to produce an output voltage when the output voltage is configured above the first reference voltage, and the second switching regulator stage operates to produce an output voltage when the output voltage is configured below the first reference voltage.

19 Claims, 6 Drawing Sheets

SWITCHING REGULATOR CIRCUITS AND METHODS

BACKGROUND

The present disclosure relates to electronic circuits, systems and apparatuses, and in particular, to switching regulator circuits and methods.

Switching regulators are a very efficient approach for providing power supply voltage and current to electronic circuits and systems. Such regulators use one or more inductors and switches to store energy in magnetic fields generated as current flows through an inductor. Switches are used to selectively couple reference voltages to the inductor to either increase the energy in the inductor or allow the energy to flow to an output, for example. Accordingly, switching regulators are sometimes referred to as "switchers," "converters" (e.g., a Boost Converter or Buck Switcher).

FIG. 1 shows an example Buck switching regulator. In a Buck switching regulator, the input voltage is typically greater than the output voltage. Boost switching regulators, on the other hand, have input voltages less than the output voltages. A variety of switching regulators exist that store energy in inductors and transfer the energy using switches. In this example, a constant (or direct current, "DC") input voltage Vin is coupled to one terminal of a high side switch 103. The other terminal of the high side switch 103 is coupled to a terminal of an inductor (L) 101 and a terminal of a low side switch 102. Control circuit 104 turns switches on and off to produce a regulated output voltage Vout on capacitor Cout 199 into a load represented here as a load resistor Ro.

In some applications it is desirable to have a regulated voltage that can vary across a voltage range. For example, one application of switching regulators is in envelope tracking power amplifiers. In an envelope tracking application, a power supply voltage to a power amplifier is varied based on the input signal to be amplified so that the power amplifier receives a power supply voltage that optimizes the efficiency of the amplification process. Accordingly, a switching regulator may receive an envelope tracking signal to change the output voltage over time.

Typically, envelope tracking power supplies use a single Buck converter using slow high-voltage devices. The switching frequency is, therefore, limited and the switching regulator can only supply the low frequency content of the load current. The remainder of the load current is typically supplied from a high-speed linear amplifier. However, linear amplifiers are very inefficient and consume large amounts of power.

A wide variety of applications would benefit from a switching regulator architecture that has the ability to change output voltage quickly and efficiently.

SUMMARY

The present disclosure pertains to switching regulator circuits and methods. In one embodiment, the present disclosure includes a switching regulator circuit comprising a first switching regulator stage configured between an input voltage and a first reference voltage, a second switching regulator stage configured between the first reference voltage and a second reference voltage, and an inductor having a first terminal and a second terminal, wherein the first terminal is coupled to an output of the first switching regulator stage and an output of the second switching regulator stage. The first switching regulator stage operates to produce an output voltage when the output voltage is configured above the first reference voltage, and the second switching regulator stage operates to produce an output voltage when the output voltage is configured below the first reference voltage.

In one embodiment, the inductor is shared between the first switching regulator stage and the second switching regulator stage.

In one embodiment, the second switching regulator stage is deactivated when the first switching regulator stage operates to produce the output voltage, and wherein the first switching regulator stage is deactivated when the second switching regulator stage operates to produce the output voltage.

In one embodiment, the circuit further comprises a reference generator to produce the first reference voltage, wherein the reference generator is configured between the input voltage and the second reference voltage.

In one embodiment, the reference generator is a bidirectional switching regulator stage to source current to the first reference voltage based on the input voltage in a first mode of operation and to sink current from the first reference voltage and source current to the input voltage in a second mode of operation.

In one embodiment, the reference generator comprises a Buck-Boost switching regulator stage.

In one embodiment, the reference generator comprises a first switch having a first terminal coupled to the input voltage and a second terminal coupled to a switching node, a second switch having a first terminal coupled to the switching node and a second terminal coupled to the second reference voltage, and a second inductor having a first terminal coupled to the switching node and a second terminal to produce the first reference voltage to the first switching regulator stage and the second switching regulator stage.

In one embodiment, the reference generator further comprises a capacitor having a first terminal coupled to the second terminal of the second inductor and a second terminal coupled to the second reference voltage.

In one embodiment, the first switching regulator stage comprises a first switch having a first terminal coupled to the input voltage and a second terminal coupled to a first switching node and a second switch having a first terminal coupled to the first switching node and a second terminal coupled to the first reference voltage, and the second switching regulator stage comprises a third switch having a first terminal coupled to the first reference voltage and a second terminal coupled to a second switching node and a fourth switch having a first terminal coupled to the second switching node and a second terminal coupled to the second reference voltage.

In one embodiment, the circuit further comprises a first transistor having a first terminal coupled to the first switching node and a second terminal coupled to the first terminal of the inductor and a second transistor having a first terminal coupled to the second switching node and a second terminal coupled to the first terminal of the inductor.

In one embodiment, the circuit further comprises a selection circuit coupled to a control terminal of the first transistor and a control terminal of the second transistor, the selection circuit controlling the first transistor and the second transistor to selectively couple the first switching node and the second switching node to the first terminal of the inductor based on an output voltage configuration signal.

In one embodiment, the first reference voltage is approximately one-half a difference between the input voltage and the second reference voltage. In one embodiment, the second reference voltage is ground.

In another embodiment, the present disclosure includes a method of generating a regulated voltage comprising generating an output voltage using a first switching regulator stage configured between an input voltage and a first reference voltage when the output voltage is configured above the first reference voltage and generating the output voltage using a second switching regulator stage configured between the first reference voltage and a second reference voltage when the output voltage is configured below the first reference voltage.

In one embodiment, the first switching regulator stage and the second switching regulator stage are coupled to an inductor having a first terminal and a second terminal, wherein the first terminal is coupled to an output of the first switching regulator stage and an output of the second switching regulator stage, and wherein the output voltage is on the second terminal of the inductor.

In one embodiment, the method further comprises generating the first reference voltage using a third switching regulator configured between the input voltage and the second reference voltage.

In one embodiment, the second switching regulator stage is deactivated when the first switching regulator stage generates the output voltage, and the first switching regulator stage is deactivated when the second switching regulator stage generates the output voltage.

In another embodiment, the present disclosure includes a switching regulator circuit comprising an inductor having a first terminal and a second terminal, first switching regulator means for producing an output voltage on the second terminal of the inductor when the output voltage is configured above the first reference voltage, wherein the first switching regulator means is configured between an input voltage and a first reference voltage, and second switching regulator means for producing the output voltage on the second terminal of the inductor when the output voltage is configured below the first reference voltage, wherein the second switching regulator means is configured between the first reference voltage and a second reference voltage.

In one embodiment, the circuit further comprises third switching regulator means for producing the first reference voltage, wherein the third switching regulator means is configured between an input voltage and the second reference voltage.

In one embodiment, the circuit further comprises means for coupling an output of the first switching regulator means and an output of the second switching regulator means to the first terminal of the inductor based on an output voltage configuration signal.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
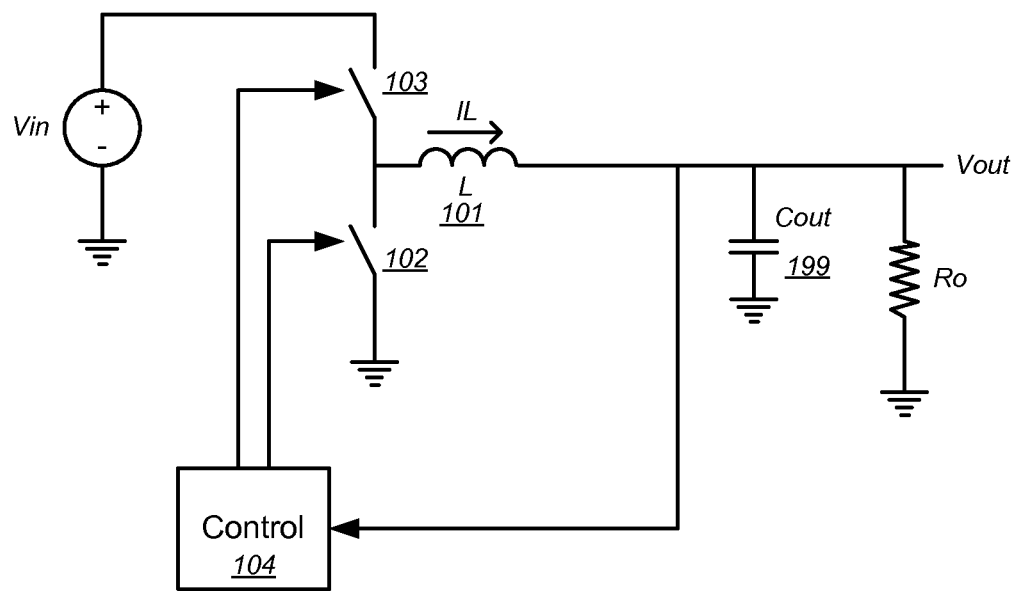
FIG. 1 illustrates a typical switching regulator.
Figure 2:
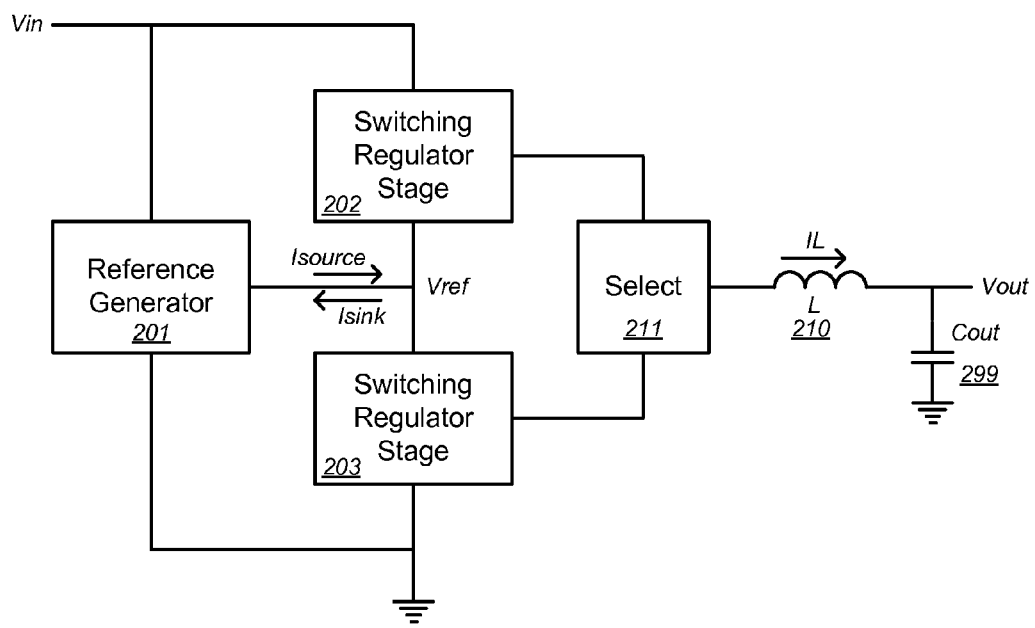
FIG. 2 illustrates a switching regulator according to an embodiment.

FIG. 2 illustrates an example switching regulator according to an embodiment. Embodiments of the present disclosure include a first switching regulator stage 202 and a second switching regulator stage 203 configured between different voltages to produce an output voltage, Vout, with a very high switching frequency. For example, switching regulator stage 202 is configured between the input voltage, Vin, and a first reference voltage, Vref. A second switching regulator stage 203 is configured between the first reference voltage, Vref, and a second reference voltage (e.g., ground). In this example, the switching regulators are stacked in series between Vin, Vref, and ground. An output of switching regulator stage 202 is coupled to a first terminal of inductor 210. Similarly, an output of switching regulator stage 203 is coupled to the first terminal of inductor 210. In this example, outputs of switching regulator stage 202 and switching regulator stage 203 are coupled to inductor 210 through a select circuit 211, which may selectively couple the switching regulator stage outputs to inductor 210 based on a desired output voltage.

Advantageously, switching regulator stage 202 may operate to produce an output voltage, Vout, on capacitor Cout 299 on the second terminal of the inductor when the output voltage is configured above reference voltage, Vref. Similarly, switching regulator stage 203 may operate to produce the output voltage, Vout, on the second terminal of the inductor when the output voltage is configured below reference voltage, Vref. Accordingly, each switching regulator stage may operate over a range of voltages less than the range between the input voltage, Vin, and ground, and may share an inductor 210 to produce output voltage, Vout, for example. In one example embodiment described in more detail below, switching regulator stage 202 operates to produce Vout over a range from Vin to one-half Vin (e.g., a range of Vin>=Vout>=Vin/2). Similarly, switching regulator stage 203 operates to produce Vout over a range from one-half Vin to ground (e.g., a range of Vin/2>=Vout>=0v). In some embodiments, the output voltage, Vout, may be controlled using an output voltage configuration signal (e.g., an envelope tracking signal in an envelope tracking application). In one embodiment, when one switching regulator stage operates to produce output voltage Vout on the second terminal of the inductor, the other switching regulator stage may be deactivated (e.g., decoupled from the inductor). For example, when switching regulator stage 202 operates to produce the output voltage, Vout, on the second terminal of inductor 210, then switching stage 203 may be deactivated. Conversely, when switching regulator stage 203 operates to produce the output voltage, Vout, on the second terminal of inductor 210, then switching stage 202 may be deactivated.

Features and advantages of the some embodiments may include a reference generator 201 to produce reference voltage, Vref, between the input voltage and lower reference voltage (e.g., ground). Accordingly, reference generator 201 is configured between Vin and ground, and Vref may be sometimes referred to herein as an intermediate reference voltage. Certain embodiments may include a reference generator that can maintain Vref at a desired level when either switching regulator stage 202 or 203 is active and regulating output voltage Vout. In some situations, reference generator 201 may be required to source current to switching stage 203 to maintain a constant voltage value of Vref. In other situations, reference generator 201 may be required to sink current from switching stage 202 to maintain a constant voltage value of Vref. Accordingly, in one embodiment, reference generator 201 is a bidirectional Buck-Boost type switching regulator. In one mode of operation (when sourcing current), a bidirectional regulator may operate in buck switching mode to produce intermediate reference voltage, Vref, based on input voltage, Vin (e.g., in a forward mode from Vin to Vref). In another mode of operation (when sinking current), a bidirectional switching regulator may source current back to input voltage, Vin, from the intermediate reference voltage, Vref (e.g., in a reverse boost mode from Vref to Vin). Additional details and an example reference generator circuit are described in more detail below.

Figure 3:
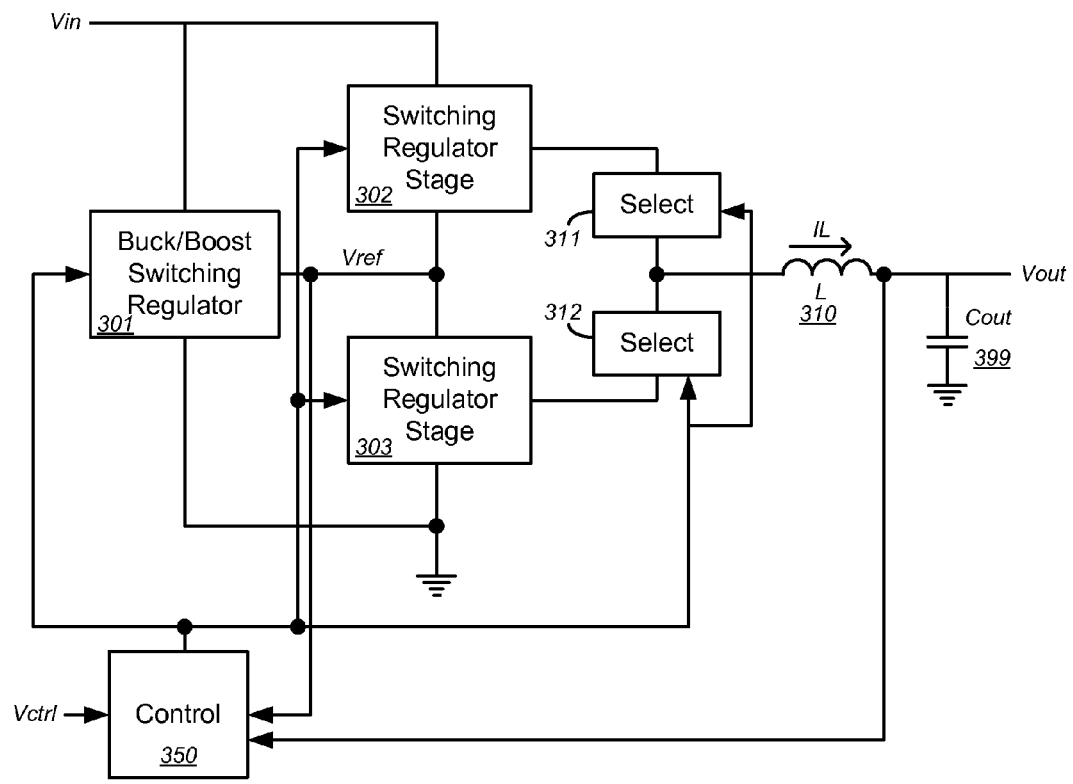
FIG. 3 illustrates a switching regulator according to another embodiment.

FIG. 3 illustrates a switching regulator according to another embodiment. In this example, switching regulator stage 302 is configured in series with switching regulator stage 303 between input voltage, Vin, and ground. An intermediate node between stage 302 and stage 303 receives reference voltage, Vref, to provide a lower power supply reference voltage for stage 302 and an upper power supply reference voltage for stage 303. Vref is produced by a bidirectional Buck/Boost switching regulator 301 configured between input voltage Vin and ground.

Some embodiments may include multiple feedback control loops to control the output voltage Vout and reference voltage Vref. In this example, control circuitry 350 is configured to receive output voltage Vout on capacitor Cout 399 and reference voltage Vref. Control circuitry 350 produces drive signals for operating switching regulator stage 302 and switching regulator stage 303 to regulate the output voltage Vout at a particular value, for example. In one embodiment, the output voltage Vout may be adjusted (increased or decreased) by a control signal, Vctrl, received in control circuitry 350. Control circuitry 350 may include internal comparator, op-amps, integrator and other circuits, and Vctrl may adjust a voltage reference at the input of a comparator or differential circuit in a voltage feedback loop, for example. Control circuitry 350 may further generate drive signals for operating Buck/Boost switching regulator 301 to regulate the reference voltage Vref at a particular value.

In this example, the outputs of switching regulator stage 302 and switching regulator stage 303 are coupled to a terminal of inductor 310 through select circuits 311 and 312. Select circuits 311 and 312 receive selection signals from a portion of control circuit 350 to selectively activate one switching regulator stage (e.g., by coupling the stage to the inductor terminal) and deactivate the other switching regulator stage (by decoupled the stage from the inductor terminal), for example. As mentioned above, switching regulator stage 302 may drive the output voltage when the output voltage is configured above Vref. Accordingly, in one embodiment, when a value of Vctrl indicates that Vout is greater than Vref, control circuitry 350 may generate control signals to select circuit 311 and 312 to disconnect switching regulator stage 303 from inductor 310 and connect switching regulator stage 302 to inductor 310. Similarly, when a value of Vctrl indicates that Vout is less than Vref, control circuitry 350 may generate control signals to select circuit 311 and 312 to disconnect switching regulator stage 302 from inductor 310 and connect switching regulator 303 to inductor 310, for example.

Figure 4:
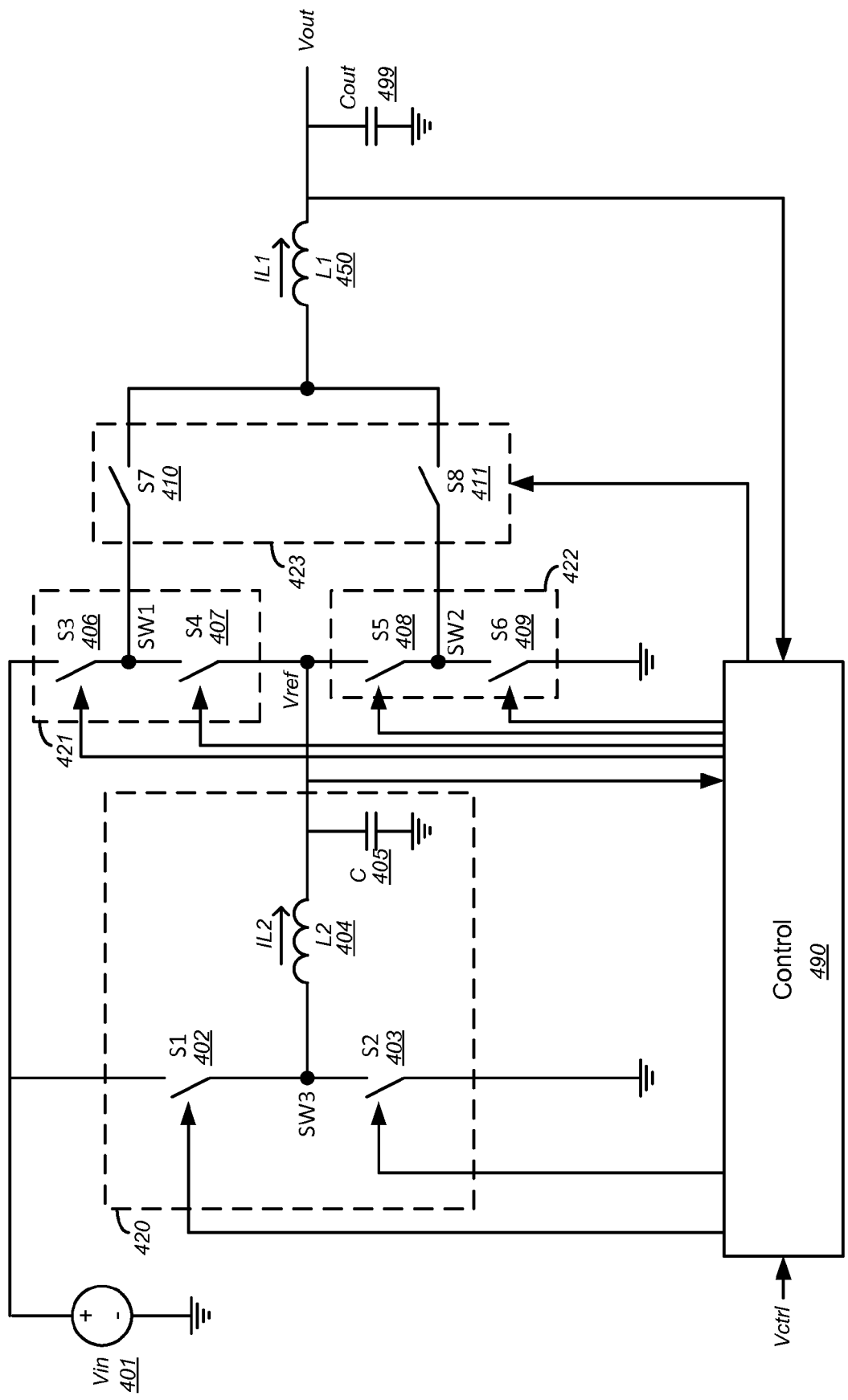
FIG. 4 illustrates an example switching regulator according to yet another embodiment.

FIG. 4 illustrates an example switching regulator according to yet another embodiment. In this example, a power supply voltage Vin 401 is coupled to series configured switching regulator stages 421 and 422 and a Buck-Boost switching regulator stage 420. In this example, Buck-Boost switching regulator stage 420 comprises switch S1 402 and switch S2 403. Switch 51 has a first terminal coupled to the input voltage Vin and a second terminal coupled to a switching node SW3. Switch S2 has a first terminal coupled to switching node SW3 and a second terminal coupled to a second reference voltage (e.g., ground). Buck-Boost switching regulator 420 includes inductor L2 404 having a first terminal coupled to switching node SW3 and a second terminal to produce an intermediate reference voltage Vref to switching regulator stage 421 and switching regulator stage 422. Buck-Boost switching regulator stage 420 further comprises a capacitor C 405 having a first terminal coupled to the second terminal of inductor 404 and a second terminal coupled to ground to stored intermediate reference voltage Vref, for example. In some embodiments, for example, the switches may be implemented with standard CMOS transistor technology.

In this example, switching regulator stage 421 comprises switch S3 406 having a first terminal coupled to the input voltage Vin and a second terminal coupled to switching node SW1. Switching node SW1 is coupled to a first terminal of switch S4 407. Switch S4 includes a second terminal coupled to reference voltage Vref. Switching regulator stage 422 comprises switch S5 408 and switch S6 409. Switch S6 has a first terminal coupled to reference voltage Vref and a second terminal coupled to switching node SW2. Switch S6 has a first terminal coupled to switching node SW2 and a second terminal coupled to ground.

In this example, the output voltage Vout on capacitor Cout 499 may be alternately generated by switching regulator stages 421 and 422 by opening and closing switch S7 410 and switch S8 411 based on the output voltage to be achieved. As mentioned above, when the output voltage is configured to be greater than Vref, switching regulator stage 421 may be activated to produce Vout by closing switch S7. When switch S7 is closed, switching node SW1 is coupled to inductor 450 to drive current in the inductor and produce output voltage Vout. In this state, switching regulator stage 422 may be deactivated by opening switch S8 to decouple switching node SW2 from inductor 450. Alternatively, when the output voltage is configured to be less than Vref, switching regulator stage 422 may be activated to produce Vout by closing switch S8. When switch S8 is closed, switching node SW2 is coupled to inductor 450 to drive current in the inductor and produce output voltage Vout. In this state, switching regulator stage 421 may be deactivated by opening switch S7 to decouple switching node SW1 from inductor 450.

As illustrated in FIG. 4, switching regulator stages 421 and 422 are Buck switching regulators. In a Buck switching regulator, the switching regulator input voltage is greater than the switching regulator output voltage. The high side switch (e.g., S3 and S5) and the low side switch (e.g., S4 and S6) are turned on and off by control circuitry 490 according to a duty cycle, where the duty cycle is given by a ratio of the switching regulator output voltage over the switching regulator input voltage (i.e., D=Vo/Vin). In this example, switching regulator stage 422 operates using Vref as an input voltage. Thus, when Vout is less than Vref (and stage 422 is active), the duty cycle is D=Vo/Vref. When the high side switch S5 is closed and the low side switch S6 is open, a voltage of Vref−Vout (Vout<Vref) is applied across inductor 450 and the inductor current IL1 (i.e., into the load) increases. When the low side switch S6 is closed and the high side switch S5 is open, a voltage of Vout-gnd is applied across inductor 450 and the inductor current IL1 decreases. Similarly, switching regulator stage 421 operates using Vin as an input voltage, but stage 421 is referenced to Vref on the low side. Thus, when Vout is greater than Vref (and stage 421 is active), the duty cycle is D=(Vo−Vref)/(Vin−Vref). When the high side switch S3 is closed and the low side switch S4 is open, a voltage of Vin−Vout is applied across inductor 450 and the inductor current IL1 increases. When the low side switch S4 is closed and the high side switch S3 is open, a voltage of Vout−Vref (Vout>Vref) is applied across inductor 450 and the inductor current IL1 decreases. Feedback circuits in control circuitry 490 may sense the output voltage and/or inductor current to maintain Vout at a particular level, which may be set by an output voltage configuration signal Vctrl, for example.

In this example, intermediate reference voltage Vref is regulated by Buck-Boost switching regulator stage 420, inductor 404, and capacitor 405. In boost mode, stage 421 is active and stage 422 is inactive (e.g., when Vout>Vref). In this case, current drawn in stage 421 is boosted back to input voltage Vin. Accordingly, in this mode of operation the system sinks current from the reference voltage Vref and sources it back to the input voltage Vin to improve overall system efficiency.

Figure 5:
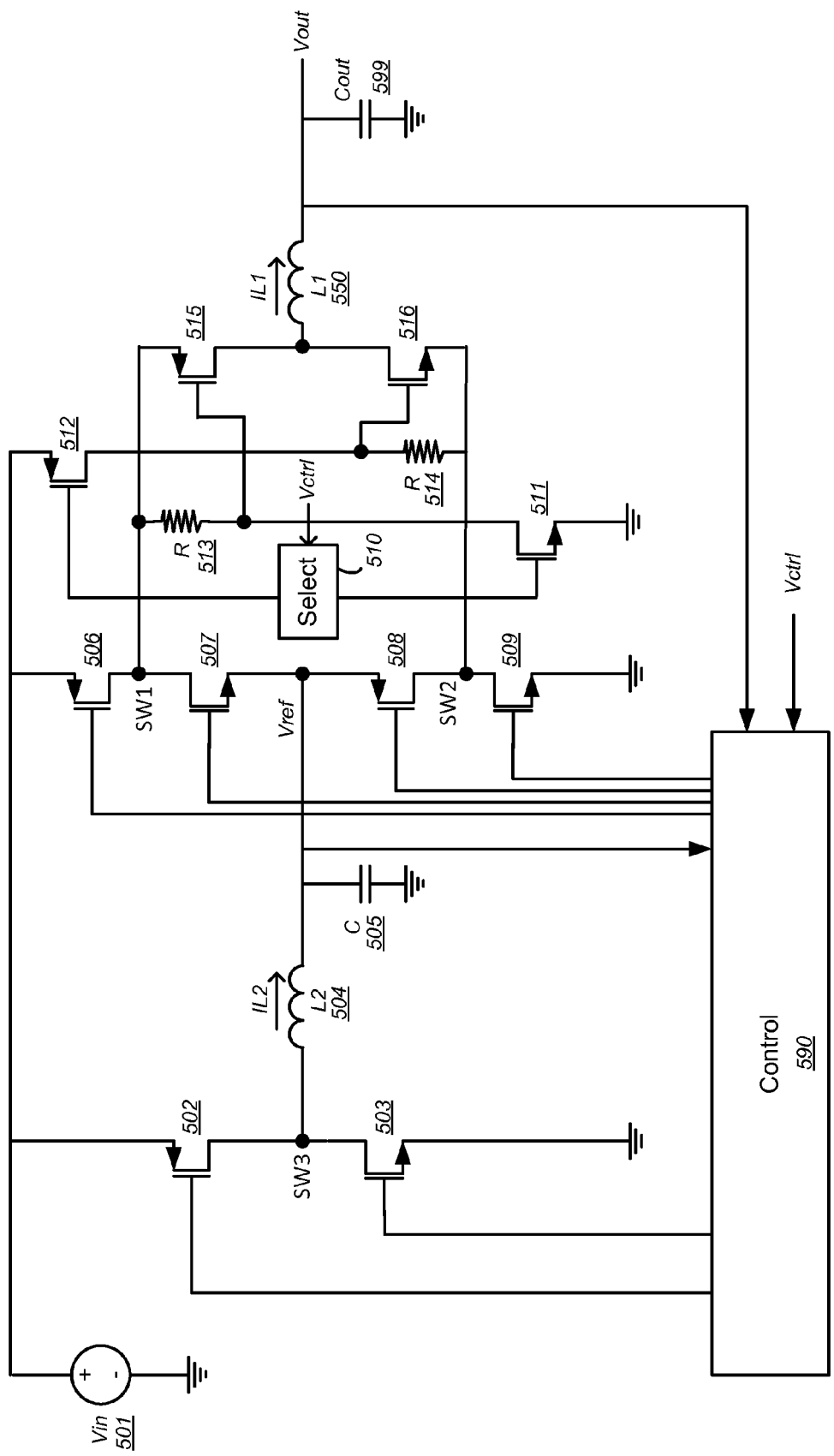
FIG. 5 illustrates an example implementation of a switching regulator according to an embodiment.

FIG. 5 illustrates an example implementation of a switching regulator according to an embodiment. In this example, an input voltage Vin is received from a power supply 501. In one embodiment, power supply 501 may be generated from a battery on a mobile electronic device, such as a cell phone, smart phone, tablet computing device, or personal fitness device, for example. A typical value for such batteries is around 4V, for example. Input voltage Vin is received at the input of a switching regulator comprising PMOS transistor 502 and NMOS transistor 503, which act as switches. In this example, drain terminals of transistors 502 and 503 are coupled together to form a switching node SW3, which is coupled to a terminal of inductor L2 504. The other terminal of inductor 504 is coupled to a terminal of capacitor C505 to form an output terminal. Control circuitry 590 is coupled to terminals of inductor 504 and capacitor 505 to sense the voltage on the output terminal. Control circuitry 590 generates signals to turn transistors 502 and 503 on and off to produce a particular reference voltage Vref. Vref may be set to one-half the difference between Vin and ground (i.e., Vin/2), which is referred to as the MIDRAIL voltage.

In this example, a first switching regulator stage comprises PMOS transistor 506 and NMOS transistor 507. A source of PMOS transistor 506 is coupled to receive input voltage Vin and a drain of PMOS transistor 506 is coupled to a drain of NMOS transistor 507 to form a switching node SW1. A source of NMOS transistor 507 is coupled to a terminal of inductor 504 to receive MIDRAIL reference voltage Vref. Similarly, a second switching regulator stage comprises PMOS transistor 508 and NMOS transistor 509. A source of PMOS transistor 508 is coupled to receive MIDRAIL reference voltage Vref and a drain of PMOS transistor 508 is coupled to a drain of NMOS transistor 509 to form a switching node SW2. A source of NMOS transistor 509 is coupled to ground.

In this example, switching regulator stages may be alternately coupled to a shared output inductor 550 to produce output voltage Vout on capacitor Cout 599 through selection circuitry comprising select control 510, NMOS transistor 511, PMOS transistor 512, resistors 513 and 514, PMOS transistor 515, and NMOS transistor 516. Selection circuitry shown in FIG. 5 is sometimes referred to as a "make-before-break" circuit (e.g., because one connection is turned on before the other is gradually turned off). Select control 510 may receive output voltage configuration signal Vctrl, for example, and may turn transistor 511 and 512 on and off.

For instance, if Vctrl sets Vout greater than Vref and Vctrl is decreasing, then as Vctrl approaches a value corresponding to Vout equal to Vref, select control 510 may start to turn PMOS 512 on and turn NMOS 511 off. When PMOS 512 turns on, current flows into resistor 514 and the voltage on the gate of NMOS 516 increases, thereby turning on NMOS 516 and coupling inductor 550 to switching node SW2 of the switching regulator stage between Vref and ground. When NMOS 511 turns off, current through resistor 513 decreases and the voltage on the gate of PMOS 515 increases, thereby turning off PMOS 515 and decoupling inductor 550 from the switching node SW1 of the switching regulator stage configured between Vin and Vref. As will be understood by those skilled in the art, the above example selection circuit is a mechanism for level shifting such that transistors 515 and 516 can be implemented using fast low voltage devices. It is to be understood that other level shifting circuits could be used in other embodiments including, but not limited to, latch level shifters, for example.

Conversely, if Vctrl sets Vout below Vref and Vctrl is increasing, then as Vctrl approaches a value corresponding to Vout equal to Vref, select control 510 may start to turn on NMOS 511 and turn PMOS 512 off. When NMOS 511 turns on, current flows in resistor 513 and the voltage on the gate of PMOS 515 decreases, thereby turning on PMOS 515 and coupling inductor 550 to switching node SW1 of the switching regulator stage between Vin and Vref. When PMOS 512 turns off, current through resistor 514 decreases and the voltage on the gate of NMOS 516 decreases, thereby turning off NMOS 516 and decoupling inductor 550 from the switching node SW2 of the switching regulator stage configured between Vref and ground.

Figure 6:
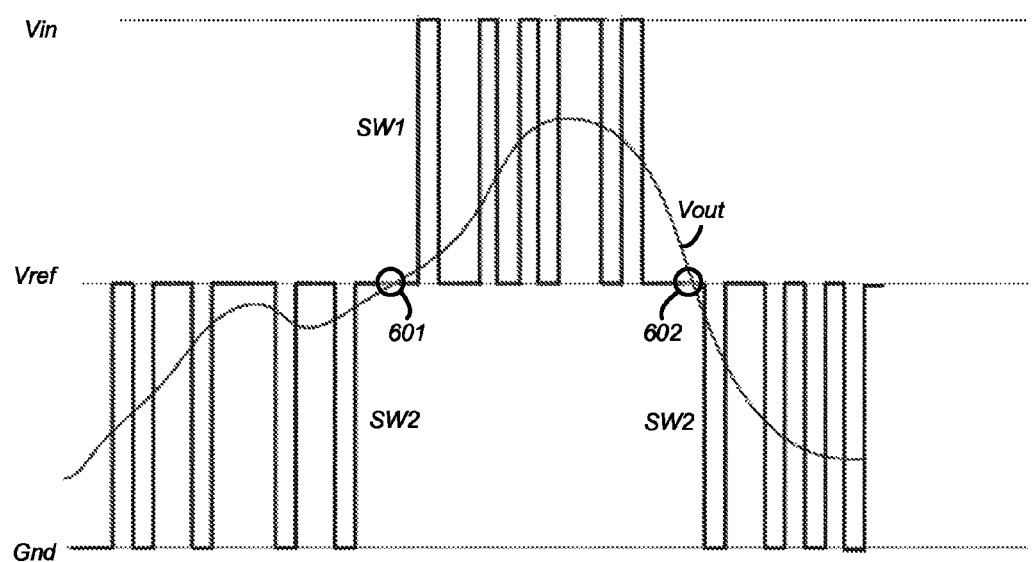
FIG. 6 illustrates waveforms for the circuit of FIG. 5 according to another embodiment.

FIG. 6 illustrates waveforms for the circuit of FIG. 5 according to another embodiment. FIG. 6 illustrates how the circuit may be used in an envelope tracking application, where Vctrl is used to control the level of Vout. As illustrated in FIG. 6, Vout (and Vctrl) vary over time such that Vout may be above or below Vref (e.g., the MIDRAIL reference voltage). In this example, Vout is initially less than Vref. Accordingly, SW1 is decoupled from the output inductor and SW2 is used to produce Vout. In this case, the buck-boost operates in buck-mode. When Vout is configured to increase above Vref, SW2 is decoupled from the output inductor and SW1 is used to produce Vout. In this case, the buck-boost operates in boost-mode.

As illustrated in FIG. 6, switching nodes SW1 and SW2 may operate at very high frequencies in some applications (e.g., envelope tracking) to generate an output voltage Vout that can be used to vary the power supply voltage of an RF power amplifier, for example. Because the series configured switching stages (e.g., transistors 506-509) never see more than ½ of the Vin voltage, these transistors may be designed to be very fast using thin oxide (e.g., core) devices with lower breakdown voltages to maintain good efficiency at very high switching frequencies. In an envelope tracking application, the high switching frequency and the 3-level nature of the circuit may also reduce out-of band noise (or receive band (RXBNA) noise) and push it out of band, eliminating or reducing the need of a linear class-AB amplifier, for example. Further, another advantage of fast switching series configured switching regulator stages may include a reduction in the size of inductor 550 because of the increased switching frequency, for example.

In the example shown in FIG. 6, transitions of Vout across Vref (at 601 and 602) may have a half period of a cycle to complete the transition. Thus, the make-before break circuit, for example, may operate over one-half period of a cycle when Vctrl waveform switches transitions across Vref. In some applications, lower frequency demands on the selection circuitry may allow for transistors 511 and 512 to be larger devices with low on resistances (RDSON) than the faster transistors devices used for switching transistors 506-509, for example.

Similarly, the reference generator circuitry (e.g., transistors 502 and 503) may be designed to be much slower than the faster stacked switchers. Accordingly, in some embodiments, switching regulator transistors 502 and 503 may be designed using slower thicker oxide devices than the faster thinner oxide devices used for transistors 506-509.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A switching regulator circuit comprising:
   a first switching regulator stage configured between an input voltage and a first reference voltage, the first switching regulator stage comprising
      a first switch having a first terminal coupled to the input voltage and a second terminal coupled to a first switching node, and
      a second switch having a first terminal coupled to the first switching node and a second terminal coupled to a first reference voltage;
   a second switching regulator stage configured between the first reference voltage and a second reference voltage, the second switching regulator stage comprising
      a third switch having a first terminal coupled to the first reference voltage and a second terminal coupled to a second switching node; and
      a fourth switch having a first terminal coupled to the second switching node and a second terminal coupled to the second reference voltage; and
   an inductor having a first terminal and a second terminal, wherein the first terminal is coupled to an output of the first switching regulator stage and an output of the second switching regulator stage,
   wherein the first switching regulator stage operates to produce an output voltage on the second terminal of the inductor when the output voltage is configured above the first reference voltage, and wherein the second switching regulator stage operates to produce an output voltage on the second terminal of the inductor when the output voltage is configured below the first reference voltage.

2. The circuit of claim 1 wherein the inductor is shared between the first switching regulator stage and the second switching regulator stage.

3. The circuit of claim 1, wherein the second switching regulator stage is deactivated when the first switching regulator stage operates to produce the output voltage, and wherein the first switching regulator stage is deactivated when the second switching regulator stage operates to produce the output voltage.

4. The circuit of claim 1 further comprising a reference generator to produce the first reference voltage, wherein the reference generator is configured between the input voltage and the second reference voltage.

5. The circuit of claim 4 wherein the reference generator is a bidirectional switching regulator stage to source current to the first reference voltage based on the input voltage in a first mode of operation and to sink current from the first reference voltage and source current to the input voltage in a second mode of operation.

6. The circuit of claim 4 wherein the reference generator comprises a Buck-Boost switching regulator stage.

7. The circuit of claim 4, the reference generator comprising:
   a first switch having a first terminal coupled to the input voltage and a second terminal coupled to a switching node;
   a second switch having a first terminal coupled to the switching node and a second terminal coupled to the second reference voltage; and
   a second inductor having a first terminal coupled to the switching node and a second terminal to produce the first reference voltage to the first switching regulator stage and the second switching regulator stage.

8. The circuit of claim 7, the reference generator further comprising a capacitor having a first terminal coupled to the second terminal of the second inductor and a second terminal coupled to the second reference voltage.

9. The circuit of claim 1 further comprising:
   a first transistor having a first terminal coupled to the first switching node and a second terminal coupled to the first terminal of the inductor; and
   a second transistor having a first terminal coupled to the second switching node and a second terminal coupled to the first terminal of the inductor.

10. The circuit of claim 1 further comprising a selection circuit coupled to a control terminal of the first transistor and a control terminal of the second transistor, the selection circuit controlling the first transistor and the second transistor to selectively couple the first switching node and the second switching node to the first terminal of the inductor based on an output voltage configuration signal.

11. The circuit of claim 1 wherein the first reference voltage is approximately one-half a difference between the input voltage and the second reference voltage.

12. The circuit of claim 1 wherein the second reference voltage is ground.

13. A method of generating a regulated voltage comprising:
   generating an output voltage using a first switching regulator stage configured between an input voltage and a first reference voltage when the output voltage is configured above the first reference voltage, the first switching regulator stage comprising
   a first switch having a first terminal coupled to the input voltage and a second terminal coupled to a first switching node, and a second switch having a first terminal coupled to the first switching node and a second terminal coupled to a first reference voltage; and generating the output voltage using a second switching regulator stage configured between the first reference voltage and a second reference voltage when the output voltage is configured below the first reference voltage, the second switching regulator stage comprising a third switch having a first terminal coupled to the first reference voltage and a second terminal coupled to a second switching node; and a fourth switch having a first terminal coupled to the second switching node and a second terminal coupled to the second reference voltage.

14. The method of claim 13 wherein the first switching regulator stage and the second switching regulator stage are coupled to an inductor having a first terminal and a second terminal, wherein the first terminal is coupled to an output of the first switching regulator stage and an output of the second switching regulator stage, and wherein the output voltage is on the second terminal of the inductor.

15. The method of claim 13 further comprising generating the first reference voltage using a third switching regulator configured between the input voltage and the second reference voltage.

16. The method of claim 13 wherein the second switching regulator stage is deactivated when the first switching regulator stage generates the output voltage, and wherein the first switching regulator stage is deactivated when the second switching regulator stage generates the output voltage.

17. A switching regulator circuit comprising:

an inductor having a first terminal and a second terminal;

first switching regulator means for producing an output voltage on the second terminal of the inductor when the output voltage is configured above the first reference voltage, wherein the first switching regulator means is configured between an input voltage and a first reference voltage, the first switching regulator means comprising a first switch having a first terminal coupled to the input voltage and a second terminal coupled to a first switching node, and a second switch having a first terminal coupled to the first switching node and a second terminal coupled to a first reference voltage; and second switching regulator means for producing the output voltage on the second terminal of the inductor when the output voltage is configured below the first reference voltage, wherein the second switching regulator means is configured between the first reference voltage and a second reference voltage, the second switching regulator stage comprising a third switch having a first terminal coupled to the first reference voltage and a second terminal coupled to a second switching node; and a fourth switch having a first terminal coupled to the second switching node and a second terminal coupled to the second reference voltage.

18. The circuit of claim 17 further comprising third switching regulator means for producing the first reference voltage, wherein the third switching regulator means is configured between an input voltage and the second reference voltage.

19. The circuit of claim 17 means for coupling an output of the first switching regulator means and an output of the second switching regulator means to the first terminal of the inductor based on an output voltage configuration signal.

* * * * *